United States Patent
Song et al.

(10) Patent No.: US 8,863,221 B2
(45) Date of Patent: Oct. 14, 2014

(54) METHOD AND SYSTEM FOR INTEGRATING CONTENT AND SERVICES AMONG MULTIPLE NETWORKS

(75) Inventors: Yu Song, Pleasanton, CA (US); Mithun Sheshagiri, Berkeley, CA (US); Alan Messer, Los Gatos, CA (US)

(73) Assignee: Samsung Electronics Co., Ltd., Suwon (KR)

(*) Notice: Subject to any disclaimer, the term of this patent is extended or adjusted under 35 U.S.C. 154(b) by 1750 days.

(21) Appl. No.: 11/713,312

(22) Filed: Mar. 1, 2007

(65) Prior Publication Data

US 2007/0211762 A1 Sep. 13, 2007

Related U.S. Application Data

(60) Provisional application No. 60/780,105, filed on Mar. 7, 2006.

(51) Int. Cl.
  *G06F 15/16* (2006.01)
  *H04J 1/00* (2006.01)
  *H04N 7/173* (2011.01)
  *H04L 29/08* (2006.01)
  *H04L 12/46* (2006.01)

(52) U.S. Cl.
  CPC ............... *H04L 12/46* (2013.01); *H04L 67/16* (2013.01)
  USPC ............. 725/141; 370/490; 709/201; 725/86; 717/169

(58) Field of Classification Search
  CPC . H04L 63/0428; H04N 21/4622; H04W 4/00; H04W 80/00
  USPC .................. 370/490, 401; 709/203, 201, 246; 717/168–178; 725/135, 86
  See application file for complete search history.

(56) References Cited

U.S. PATENT DOCUMENTS 5,410,326 A * 4/1995 Goldstein ..................... 348/734
5,790,935 A  8/1998 Payton (Continued)

FOREIGN PATENT DOCUMENTS

| CN | 1393107 | 1/2003 |
| CN | 1723458 | 1/2006 |

(Continued)

OTHER PUBLICATIONS

Notification of Transmittal of the International Search Report and the Written Opinion of the International Search Authority Application No. PCT/KR2008/000537 dated May 15, 2008, 16 pages.

(Continued)

*Primary Examiner* — Asad Nawaz
*Assistant Examiner* — Wutchung Chu
(74) *Attorney, Agent, or Firm* — Kenneth L. Sherman, Esq.; Michael Zarrabian, Esq.; Sherman & Zarrabian LLP

(57) ABSTRACT

A method and system that enables aggregation and management of services and contents on multiple networks, is provided. In one implementation, such a method and system functionally bridges a first network and a second network such that services and contents, no matter where they come from, can be delivered to a user on one or more devices in the second network. The services and contents in the first network are converted by certain applications to behave as if they exist in the second network, so that they can be accessed by one or more devices in the second network. Such a method and system enables applications to be easily developed and distributed over the Internet using popular Web browsers as the platform for application runtime environments.

22 Claims, 5 Drawing Sheets

(56) References Cited

U.S. PATENT DOCUMENTS

| | | | |
|---|---|---|---|
| 5,831,664 A * | 11/1998 | Wharton et al. | 725/81 |
| 5,974,406 A | 10/1999 | Bisdikian et al. | |
| 5,983,214 A | 11/1999 | Lang et al. | |
| 5,983,237 A | 11/1999 | Jain et al. | |
| 5,995,959 A | 11/1999 | Friedman et al. | |
| 6,151,603 A | 11/2000 | Wolfe | |
| 6,253,238 B1 | 6/2001 | Lauder et al. | |
| 6,311,197 B2 * | 10/2001 | Mighdoll et al. | 715/201 |
| 6,334,127 B1 | 12/2001 | Bieganski et al. | |
| 6,412,073 B1 | 6/2002 | Rangan | |
| 6,438,579 B1 | 8/2002 | Hosken | |
| 6,480,844 B1 | 11/2002 | Cortes et al. | |
| 6,637,028 B1 | 10/2003 | Voyticky et al. | |
| 6,721,748 B1 | 4/2004 | Knight et al. | |
| 6,766,523 B2 | 7/2004 | Herley | |
| 6,774,926 B1 | 8/2004 | Ellis et al. | |
| 6,807,675 B1 | 10/2004 | Maillard | |
| 6,826,512 B2 * | 11/2004 | Dara-Abrams et al. | 702/183 |
| 6,842,877 B2 | 1/2005 | Robarts et al. | |
| 6,954,755 B2 | 10/2005 | Reisman | |
| 6,981,040 B1 | 12/2005 | Konig et al. | |
| 7,028,024 B1 | 4/2006 | Kommers et al. | |
| 7,054,875 B2 | 5/2006 | Keith, Jr. | |
| 7,062,561 B1 | 6/2006 | Reisman | |
| 7,069,575 B1 | 6/2006 | Goode et al. | |
| 7,110,998 B1 | 9/2006 | Bhandari et al. | |
| 7,158,961 B1 | 1/2007 | Charikar | |
| 7,162,473 B2 | 1/2007 | Dumais et al. | |
| 7,165,080 B2 | 1/2007 | Kotcheff et al. | |
| 7,181,438 B1 | 2/2007 | Szabo | |
| 7,194,460 B2 | 3/2007 | Komamura | |
| 7,203,940 B2 * | 4/2007 | Barmettler et al. | 717/178 |
| 7,225,187 B2 | 5/2007 | Dumais et al. | |
| 7,284,202 B1 | 10/2007 | Zenith | |
| 7,343,365 B2 | 3/2008 | Farnham et al. | |
| 7,363,294 B2 | 4/2008 | Billsus et al. | |
| 7,386,542 B2 | 6/2008 | Maybury et al. | |
| 7,389,224 B1 | 6/2008 | Elworthy | |
| 7,389,307 B2 | 6/2008 | Golding | |
| 7,433,935 B1 * | 10/2008 | Obert | 709/219 |
| 7,552,114 B2 | 6/2009 | Zhang et al. | |
| 7,565,345 B2 | 7/2009 | Bailey et al. | |
| 7,593,921 B2 | 9/2009 | Goronzy et al. | |
| 7,603,349 B1 | 10/2009 | Kraft et al. | |
| 7,617,176 B2 | 11/2009 | Zeng et al. | |
| 7,627,658 B2 * | 12/2009 | Levett et al. | 709/223 |
| 7,634,461 B2 | 12/2009 | Oral et al. | |
| 7,657,518 B2 | 2/2010 | Budzik et al. | |
| 7,664,871 B2 * | 2/2010 | del Val et al. | 709/231 |
| 7,668,939 B2 * | 2/2010 | Encarnacion et al. | 709/220 |
| 7,685,192 B1 | 3/2010 | Scofield et al. | |
| 7,716,158 B2 | 5/2010 | McConnell | |
| 7,716,199 B2 | 5/2010 | Guha | |
| 7,793,326 B2 | 9/2010 | McCoskey | |
| 7,933,290 B2 * | 4/2011 | Aholainen | 370/466 |
| 7,987,491 B2 * | 7/2011 | Reisman | 725/112 |
| 2001/0003214 A1 | 6/2001 | Shastri et al. | |
| 2001/0023433 A1 | 9/2001 | Natsubori et al. | |
| 2002/0010932 A1 * | 1/2002 | Nguyen et al. | 725/51 |
| 2002/0019984 A1 * | 2/2002 | Rakib | 725/111 |
| 2002/0022491 A1 | 2/2002 | McCann et al. | |
| 2002/0026436 A1 * | 2/2002 | Joory | 707/1 |
| 2002/0032698 A1 * | 3/2002 | Cox | 707/501.1 |
| 2002/0087535 A1 | 7/2002 | Kotcheff et al. | |
| 2002/0120666 A1 * | 8/2002 | Landsman et al. | 709/200 |
| 2002/0161767 A1 | 10/2002 | Shapiro et al. | |
| 2002/0162120 A1 * | 10/2002 | Mitchell | 725/135 |
| 2002/0162121 A1 | 10/2002 | Mitchell | |
| 2002/0184499 A1 * | 12/2002 | Taguchi et al. | 713/168 |
| 2003/0028889 A1 | 2/2003 | McCoskey | |
| 2003/0033273 A1 | 2/2003 | Wyse | |
| 2003/0105682 A1 | 6/2003 | Dicker et al. | |
| 2003/0131013 A1 | 7/2003 | Pope et al. | |
| 2003/0158855 A1 | 8/2003 | Farnham et al. | |
| 2003/0172075 A1 | 9/2003 | Reisman | |
| 2003/0184582 A1 | 10/2003 | Cohen | |
| 2003/0188322 A1 * | 10/2003 | Bontempi | 725/139 |
| 2003/0221198 A1 | 11/2003 | Sloo | |
| 2003/0229900 A1 | 12/2003 | Reisman | |
| 2003/0231868 A1 | 12/2003 | Herley | |
| 2004/0031058 A1 | 2/2004 | Reisman | |
| 2004/0073944 A1 | 4/2004 | Booth | |
| 2004/0082471 A1 * | 4/2004 | Ilinich et al. | 502/346 |
| 2004/0085947 A1 * | 5/2004 | Ekberg et al. | 370/349 |
| 2004/0194141 A1 | 9/2004 | Sanders | |
| 2004/0244038 A1 | 12/2004 | Utsuki et al. | |
| 2004/0249790 A1 | 12/2004 | Komamura | |
| 2005/0004910 A1 | 1/2005 | Trepess | |
| 2005/0097087 A1 * | 5/2005 | Punaganti Venkata et al. | 707/3 |
| 2005/0137996 A1 | 6/2005 | Billsus et al. | |
| 2005/0144158 A1 | 6/2005 | Capper et al. | |
| 2005/0154711 A1 | 7/2005 | McConnell | |
| 2005/0160460 A1 | 7/2005 | Fujiwara et al. | |
| 2005/0177555 A1 | 8/2005 | Alpert et al. | |
| 2005/0240580 A1 | 10/2005 | Zamir et al. | |
| 2005/0246726 A1 | 11/2005 | Labrou et al. | |
| 2005/0289599 A1 | 12/2005 | Matsura et al. | |
| 2006/0026152 A1 | 2/2006 | Zeng et al. | |
| 2006/0028682 A1 * | 2/2006 | Haines | 358/1.15 |
| 2006/0036593 A1 | 2/2006 | Dean et al. | |
| 2006/0066573 A1 | 3/2006 | Matsumoto | |
| 2006/0067489 A1 * | 3/2006 | Morioka | 379/93.12 |
| 2006/0074883 A1 | 4/2006 | Teevan et al. | |
| 2006/0084430 A1 | 4/2006 | Ng | |
| 2006/0095415 A1 | 5/2006 | Sattler et al. | |
| 2006/0133391 A1 * | 6/2006 | Kang et al. | 370/401 |
| 2006/0136670 A1 | 6/2006 | Brown et al. | |
| 2006/0156326 A1 | 7/2006 | Goronzy et al. | |
| 2006/0161542 A1 | 7/2006 | Cucerzan et al. | |
| 2006/0179079 A1 * | 8/2006 | Kolehmainen | 707/104.1 |
| 2006/0195362 A1 | 8/2006 | Jacobi et al. | |
| 2006/0242283 A1 | 10/2006 | Shaik et al. | |
| 2006/0291412 A1 * | 12/2006 | Naqvi et al. | 370/328 |
| 2007/0022419 A1 * | 1/2007 | Subbarao et al. | 717/173 |
| 2007/0043703 A1 | 2/2007 | Bhattacharya et al. | |
| 2007/0050346 A1 | 3/2007 | Goel et al. | |
| 2007/0061222 A1 | 3/2007 | Allocca et al. | |
| 2007/0061352 A1 | 3/2007 | Dimitrova et al. | |
| 2007/0073894 A1 | 3/2007 | Erickson et al. | |
| 2007/0078822 A1 | 4/2007 | Cuzerzan et al. | |
| 2007/0107019 A1 * | 5/2007 | Romano et al. | 725/80 |
| 2007/0121651 A1 * | 5/2007 | Casey et al. | 370/401 |
| 2007/0130585 A1 | 6/2007 | Perret et al. | |
| 2007/0143266 A1 | 6/2007 | Tang et al. | |
| 2007/0156447 A1 | 7/2007 | Kim et al. | |
| 2007/0179776 A1 | 8/2007 | Segond et al. | |
| 2007/0198485 A1 | 8/2007 | Ramer et al. | |
| 2007/0198500 A1 | 8/2007 | Lucovsky et al. | |
| 2007/0214123 A1 | 9/2007 | Messer et al. | |
| 2007/0214488 A1 | 9/2007 | Nguyen et al. | |
| 2007/0220037 A1 | 9/2007 | Srivastava et al. | |
| 2007/0233287 A1 | 10/2007 | Sheshagiri et al. | |
| 2007/0300078 A1 | 12/2007 | Ochi et al. | |
| 2008/0040316 A1 | 2/2008 | Lawrence | |
| 2008/0082744 A1 | 4/2008 | Nakagawa | |
| 2008/0108437 A1 * | 5/2008 | Kaarela et al. | 463/42 |
| 2008/0114751 A1 | 5/2008 | Cramer et al. | |
| 2008/0133501 A1 | 6/2008 | Andersen et al. | |
| 2008/0133504 A1 | 6/2008 | Messer et al. | |
| 2008/0162651 A1 | 7/2008 | Madnani | |
| 2008/0162731 A1 | 7/2008 | Kauppinen et al. | |
| 2008/0183596 A1 | 7/2008 | Nash et al. | |
| 2008/0183681 A1 | 7/2008 | Messer et al. | |
| 2008/0183698 A1 | 7/2008 | Messer et al. | |
| 2008/0204595 A1 | 8/2008 | Rathod et al. | |
| 2008/0208839 A1 | 8/2008 | Sheshagiri et al. | |
| 2008/0235209 A1 | 9/2008 | Rathod et al. | |
| 2008/0235393 A1 | 9/2008 | Kunjithapatham et al. | |
| 2008/0242279 A1 | 10/2008 | Ramer et al. | |
| 2008/0250010 A1 | 10/2008 | Rathod et al. | |
| 2008/0266449 A1 | 10/2008 | Rathod et al. | |
| 2008/0288641 A1 | 11/2008 | Messer et al. | |
| 2009/0029687 A1 | 1/2009 | Ramer et al. | |
| 2009/0055393 A1 | 2/2009 | Messer et al. | |

(56) References Cited

U.S. PATENT DOCUMENTS

| | | | |
|---|---|---|---|
| 2009/0077065 | A1 | 3/2009 | Song et al. |
| 2009/0112848 | A1 | 4/2009 | Kunjithapatham et al. |
| 2010/0070895 | A1 | 3/2010 | Messer |
| 2010/0191619 | A1 | 7/2010 | Dicker et al. |
| 2011/0191771 | A1* | 8/2011 | Balassanian ................. 717/178 |

FOREIGN PATENT DOCUMENTS

| | | |
|---|---|---|
| CN | 1808430 | 7/2006 |
| JP | 2003-099442 | 4/2003 |
| KR | 10-2002-0005147 A | 1/2002 |
| KR | 10-2002-0006810 A | 1/2002 |
| KR | 10-2004-0052339 A | 6/2004 |
| KR | 10-2006-0027226 A | 3/2006 |
| WO | WO 01/37465 A2 | 5/2001 |
| WO | WO 02/43310 A2 | 5/2002 |
| WO | WO 2005/055196 A2 | 6/2005 |
| WO | WO 2007/004110 A2 | 1/2007 |

OTHER PUBLICATIONS

Notification of Transmittal of the International Search Report and the Written Opinion of the International Searching Authority for International Application No. PCT/KR2008/001558, dated Jun. 26, 2008, 10 pages.

Notification of Transmittal of the International Search Report and the Written Opinion of the International Searching Authority, dated Aug. 20, 2008; International Search Report and Written Opinion of the International Searching Authority for International Application No. PCT/KR2008/001941, 10 pages.

Babaguchi, N.; and Nitta, N., "Intermodal collaboration: A strategy for semantic content analysis for broadcasted sports video," ICIP'03, vol. 1, pp. 13-16, 2003.

Brill, E., "A simple rule-based part of speech tagger," Proceedings of the Third Conference on Applied Natural Language Processing, 1992, Trento, Italy.

Google Search Engine, http://www.google.com, downloaded Sep. 19, 2008.

Google Desktop Search, http://desktop.google.com, downloaded Sep. 19, 2008.

Henzinger, M. et al, "Query-free news search," Proceedings on the 12th International Conference on World Wide Web, May 20-23, 2003, Budapest, Hungary.

Livingston, K.; Dredze, M.; Hammond, K.; and Birnbaum, L. 2003. "Beyond broadcast: a demo," in Proceedings of the 8th international Conference on intelligent User interfaces (Miami, Florida, USA, Jan. 12-15, 2003). IUI '03. ACM Press, New York, NY, 325-325.

Microsoft Corporation, Microsoft Windows Media Player, http://www.microsoft.com/windows/windowsmedia/, downloaded Sep. 19, 2008.

MSN TV, http://www.webtv.com/pc, downloaded Sep. 19, 2008.

Opera Browser for Devices, http://www.opera.com/products/devices/, downloaded Sep. 19, 2008.

Rau Lisa, F. et al, "Domain-independent summarization of news," in Summarizing Text for Intelligent Communication, pp. 71-75, 1994, Dagstuhl, Germany.

Spalti, M., "Finding and Managing Web Content with Copernic 2000", Library Computing, Westport, pp. 217-221, vol. 18, No. 3, Sep. 2000.

Tjondronegoro, D. et al., "Extensible detection and indexing of highlight events in broadcasted sports video," Proceedings of the 29th Australasian Computer Science Conference, 2006, Hobart, Australia.

Wachman, J.; and Picard, R., "Tools for Browsing a TV Situation Comedy Based on Content Specific Attributes," Multimedia Tools and Applications, v.13 n. 3, p. 255-284, Mar. 2001.

Yahoo Search Engine, http://search.yahoo.com. downloaded Sep. 19, 2008.

Zhuang, Y. et al, "Applying semantic association to support content-based video retrieval," International workshop on Very Low Bitrate Video Coding (VLBV'98), 1998.

"Computing Meng Individual Project, ANSES—Automatic News Summarization and Extraction System,"http://mmis.doc.ic.ac.uk/pr-1.wong-2002/overview.html, downloaded Sep. 24, 2008, 4 pages.

"Placement in the DMOZ.org directory—Pure Power", DMOZ / Google Directory, posted on Apr. 30, 2005, p. 1, http://www.ahfx.net/weblog/13.

AOL LLC, http://www.aol.com, downloaded Sep. 19, 2008, pp. 1-2, United States.

Ask Search Engine, http://www.ask.com, downloaded Sep. 19, 2008, pp. 1, United States.

Chinese Office Action dated Aug. 14, 2009 issued in Chinese Patent Application No. 2008100826213 (English language translation included).

Copernic Inc., Copernic Search Engine for your PC, http://www.copernic.com, Sep. 19, 2008, US.

Copernic Inc., http://copernic.com/en/products/desktop-search/index.html, Sep. 18, 2008.

Final Office Action dated Jun. 17, 2010 from U.S. Appl. No. 11/981,019.

Final Office Action dated Mar. 16, 2011 from U.S. Appl. No. 11/981,019.

Google Inc., webhp, http://www.google.com/webhp?complete-1&h1-en, downloaded Sep. 25, 2008, p. 1.

Livingston, K. et al., "Beyond Broadcast," 8th International Conference on Intelligent User Interfaces, Jan. 2003, pp. 260-262, Association for Computing Machinery, New York, NY.

Microsoft Corporation, Microsoft Windows Media Player 10, http://www.microsofl.com/windows/windowsmedialmpl0, Sep. 19, 2008, US.

Miura, K. et al., "Automatic Generation of a Multimedia Encyclopedia from TV Programs by Using Closed Captions and Detecting Principal Viedo Objects," Proceedings of the Eigth IEEE International Sympsosium on Miltumedia (ISM '06), 2006, IEEE, 8 pages.

Miyamori, H. et al., "Webified Video: Media Conversion from TV Programs to Web Content for Cross-Media Information Integration," Proceedings Of the 16th International Conference on Database and Expert Systems Applications, 2005, pp. 176-185, Springer-Verlag, Berlin, Heidelberg.

Miyauchi et al., "Highlight Detection and Indexing in Broadcast Sports Video by Collaborative Processing of Text, Audio, and Image," Sytstems and Computers in Japan, vol. 34, No. 12, 2003, pp. 22-31, Translated from Denshi Joho Tsushin Gakkai Ronbunshi, vol. J85-D-II, No. 11, Nov. 2002, pp. 1692-1700.

Moraveji, N. et al., "DynaLine: A Non-Disruptive TV User Interface for Passive Browsing of Internet Video,"Microsofl Research Technical Report, 2006, pp. 1-4.

Nitta, Naoka et al., "Automatic Story Segmentation of Closed-Caption Text for Semantic Content Analysis of Broadcasted Sports Video," 8th International Workshop on Multimedia Information Systems, 2002, pp. 110-116.

Notification of Transmittal of the lnternational Search Report and the Written Opinion of the lnternational Searching Authority; lnternational Search Report and Written Opinion of the International Searching Authority for Application No. PCT/KR2008/000537 dated May 15, 2008, 16 pages.

Office Action dated Aug. 19, 2011 from U.S. Appl. No. 11/821,938.
Office Action dated Aug. 22, 2011 from U.S. Appl. No. 11/981,019.
Office Action dated Dec. 29, 2009 from U.S. Appl. No. 11/981,019.
Office Action dated Jul. 6, 2011 from U.S. Appl. No. 11/789,609.
Office Action dated Jun. 27, 2011 from U.S. Appl. No. 11/725,865.
Office Action dated Mar. 25, 2010 from Chinese Patent Application No. 200810082621.3, 7pp., China (English-language translation included—15 pp).
Office Action dated Oct. 6, 2010 from U.S. Appl. No. 11/981,019.
Office Action dated Sep. 1, 2011 from U.S. Appl. No. 12/263,089.
Office Action dated Sep. 21, 2011 from U.S. Appl. No. 11/633,880.
Office Action dated Sep. 27, 2011 from U.S. Appl. No. 11/969,778.
Office Action dated Sep. 8, 2011 from U.S. Appl. No. 12/544,994.
Office Action for U.S. Appl. No. 11/726,340 mailed May 19, 2009.
Office Action for U.S. Appl. No. 11/633,880 mailed May 11, 2010.

(56) References Cited

OTHER PUBLICATIONS

Office Action for U.S. Appl. No. 11/633,880 mailed Aug. 10, 2009.
Office Action for U.S. Appl. No. 11/633,880 mailed Jan. 6, 2009.
Office Action for U.S. Appl. No. 11/633,880 mailed Mar. 17, 2011.
Office Action for U.S. Appl. No. 11/633,880 mailed Oct. 28, 2010.
Office Action for U.S. Appl. No. No. 11/713,350 mailed Aug. 14, 2009.
Office Action for U.S. Appl. No. 11/713,350 mailed Mar. 2, 2009.
Office Action for U.S. Appl. No. 11/713,350 mailed Mar. 8, 2010.
Office Action for U.S. Appl. No. 11/713,350 mailed Sep. 9, 2010.
Office Action for U.S. Appl. No. 11/725,865 mailed Mar. 16, 2010.
Office Action for U.S. Appl. No. 11/725,865 mailed Mar. 4, 2011.
Office Action for U.S. Appl. No. 11/725,865 mailed Oct. 16, 2009.
Office Action for U.S. Appl. No. 11/726,340 mailed Dec. 9, 2009.
Office Action for U.S. Appl. No. 11/726,340 mailed Feb. 14, 2011.
Office Action for U.S. Appl. No. 11/726,340 mailed Oct. 14, 2010.
Office Action for U.S. Appl. No. 11/732,887 mailed on Jun. 5, 2009.
Office Action for U.S. Appl. No. 11/732,887 mailed on Dec. 4, 2009.
Office Action for U.S. Appl. No. 11/803,826 mailed Jun. 1, 2011.
Office Action for U.S. Appl. No. 11/803,826 mailed on Jul. 24, 2009.
Office Action for U.S. Appl. No. 11/803,826 mailed on Mar. 3, 2010.
Office Action for U.S. Appl. No. 11/900,847 mailed Oct. 28, 2009.
Office Action for U.S. Appl. No. 11/969,778 mailed Jun. 15, 2011.
Office Action for U.S. Appl. No. 11/969,778 mailed on Sep. 2, 2010.
Office Action for U.S. Appl. No. 11/969,778 mailed on Apr. 19, 2010.
Office Action for U.S. Appl. No. 12/056,184 mailed on Jun. 11, 2010.
Office Action for U.S. Appl. No. 12/056,184 mailed on Nov. 23, 2010.
Office Action for U.S. Appl. No. 12/263,089 mailed Mar. 25, 2011.
Realnetworks, Inc., http://www.real.com, Sep. 19, 2008, US.
Tivo Inc., http://www.tivo.com, downloaded Sep. 19, 2008, 1 page.
U.S. Advisory Action for U.S. Appl. No. 11/633,880 mailed Nov. 25, 2009.
Vechtomova, O. et al., "Query expansion with terms selected using lexical cohesion analysis of documents", Information Processing and Management: an International Journal, Oct. 2006, pp. 849-865, vol. 43, No. 4, Pergamon Press Inc., Tarrytown, New York, United States.

\* cited by examiner

METHOD AND SYSTEM FOR INTEGRATING CONTENT AND SERVICES AMONG MULTIPLE NETWORKS

RELATED APPLICATION

This application claims priority from U.S. Provisional Patent Application Ser. No. 60/780,105, filed on Mar. 7, 2006, incorporated herein by reference.

FIELD OF THE INVENTION

The present invention relates to managing contents and services among multiple networks.

BACKGROUND OF THE INVENTION

The Internet has provided new methods of delivering services and contents to users. For example, video on demand using plugin technology on browsers enables users to view live video of news programs, watch movies, etc., on a specific device in a local area network such as a home network. These technologies, however, do not allow Internet services and contents to be delivered to another device in the home network.

In addition, due to the current same origin security model, Internet services that are delivered to a Web browser in the specific device in a home network, cannot utilize services and contents in a home network. For example, Internet content, such as video, that is delivered to a PC browser in the home network cannot be played on a TV in that home network. Such shortcomings greatly hinder a user's ability to effectively utilize intelligent, networked home devices.

At the same time, homes are becoming increasingly networked and home devices have the capabilities to deliver services and contents to other home devices. However, current home networking technologies, such as universal plug and play (UPnP), are designed for in-home use only and cannot take advantage of services and contents on the Internet. Therefore, there is a disjoint between the services/contents in a home and services/contents on the Internet, and contents and services on the Internet can only be delivered to a specific device and cannot be utilized by other devices in a home network.

There is, therefore, a need for a method and system for integrating contents and services over the Internet and in a local area network, such as a home network.

BRIEF SUMMARY OF THE INVENTION

The present invention provides a method and system that enable integration (aggregation) and management of services and contents among multiple networks. In one implementation, such a method and system functionally bridges a first network and a second network such that services and contents, no matter where they come from, can be delivered to a user on one or more devices in the second network. In one example, this allows applications to be easily developed and distributed over the Internet using popular Web browsers as the platform for application runtime environments.

Integrating content on a first network with content on a second network, involves aggregating content on the second network with content on the first network by functionally bridging the first network and the second network, such that content on either network can be delivered to a user on one or more devices in the first network.

Applications are downloaded from a first network to control services and play contents on a second network. In one implementation, an application is downloaded from the first network and executed on the second network. The downloaded application can access content on the first network by interacting with another application running on the first network. The downloaded application can also access content on the second network using a bridge. A user can utilize the downloaded application to access content in both the first and second networks.

These and other features, aspects and advantages of the present invention will become understood with reference to the following description, appended claims and accompanying figures.

DETAILED DESCRIPTION OF THE INVENTION

The present invention provides a method and system for managing content among multiple networks by integration (i.e., aggregation) of services and contents among the networks. This involves bridging the networks such that services and contents, no matter where they come from, can be delivered to a user on one or more devices in a network. Such bridging includes converting the contents and services available on a first network to protocol dependent services and contents for the devices in a second network. As such, services and contents in one network are converted as if they exist in the other network, and can therefore be accessed on one or more devices (or any device) in either network.

In one example, services and contents on one network (e.g., the Internet) are integrated with the services and contents in another network, such as a local area network (e.g., a home network). This involves bridging the two networks by converting the contents and services available on the first network to protocol dependent services and contents for the devices in the second network. Applications are downloaded from the first network to control services and play contents on a second network. The downloaded applications can access content on the first network by interacting with another application (e.g., service) running on the first network. The downloaded applications can also access content on the second network. A user can utilize a downloaded application to access content in both the first and second networks.

Further, downloaded applications allow contents and services on the first network to be delivered to one or more devices (not just a specific device) in the second network to be utilized. For example, the user can stream a video/movie to a TV, as opposed to only a desktop PC, for better viewing.

As such, in one example, the present invention functionally bridges the Internet and a home network such that services and contents, no matter the source, can be delivered to a user on one or more devices in the home network. In addition, the present invention enables applications to be easily developed and distributed over the Internet using popular Web browsers as the platform for application runtime environments.

The Internet has become a popular delivery vehicle for services and contents to users. Advances in scripting and plugin technologies enable web servers to deliver dynamic, live audio/video content to desktops. Examples of such technologies include Asynchronous JavaScript and XML (AJAX), flash players, real players, etc. Coupling scripting and browser platform enables Internet applications to be distributed and run on many different devices and platforms without re-development and re-compilation of applications. Further, middleware technologies, such as UPnP, advocate the promise of networked home devices that can seamlessly work together to greatly simplify our daily lives.

Figure 1:
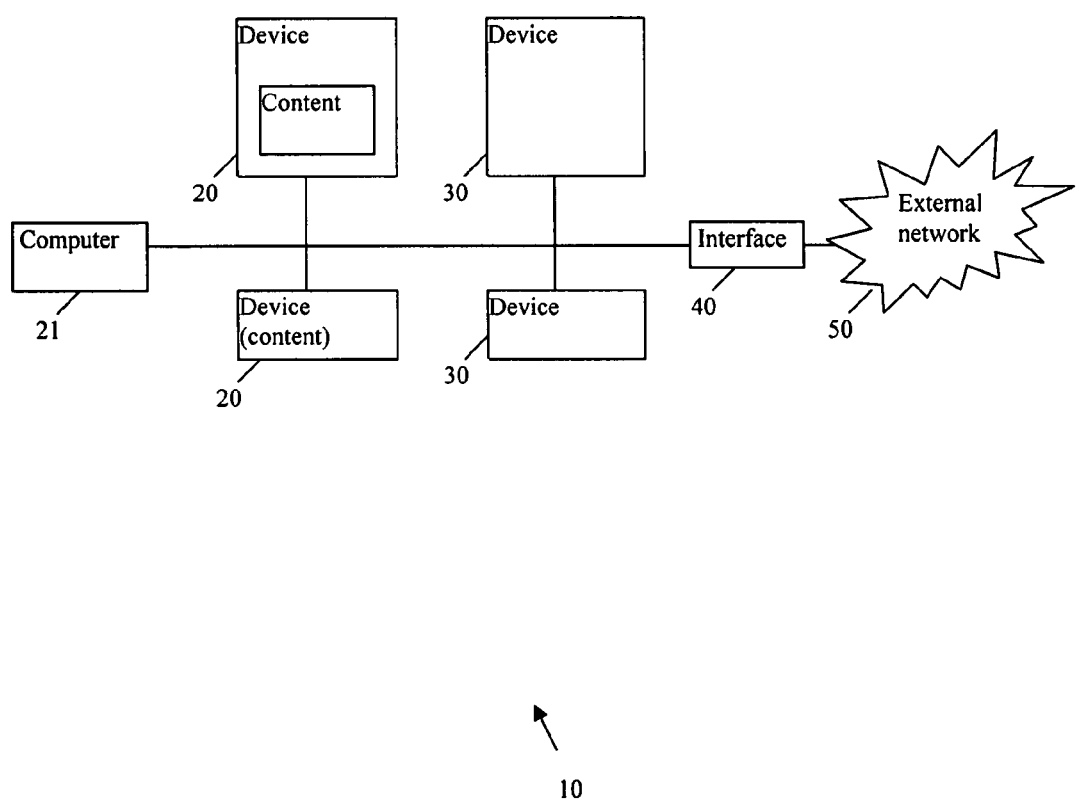
FIG. 1 shows a functional block diagram of an example home network implementing an embodiment of the present invention.

FIG. 1 shows an example functional architecture of a network such as a home network 10 that implements integrating contents and services with another network, such as the Internet. The network 10 comprises devices 20 (providing content) and devices 30, a computer (PC) 21, an interface 40 that connects to the network 10 to another network 50 (e.g., an external network, the Internet, etc.). Though the logical devices 20 and 30 are shown separately, a single physical device can include one or more logical devices. The devices 20, 30 can comprise electronic devices including consumer electronic (CE) devices (e.g., TV, PVR, DVD player, CD player, DVR, PDA, etc.), appliances, etc. Services and contents from the Internet are transcoded into services and contents in the home network 10.

Figure 2:
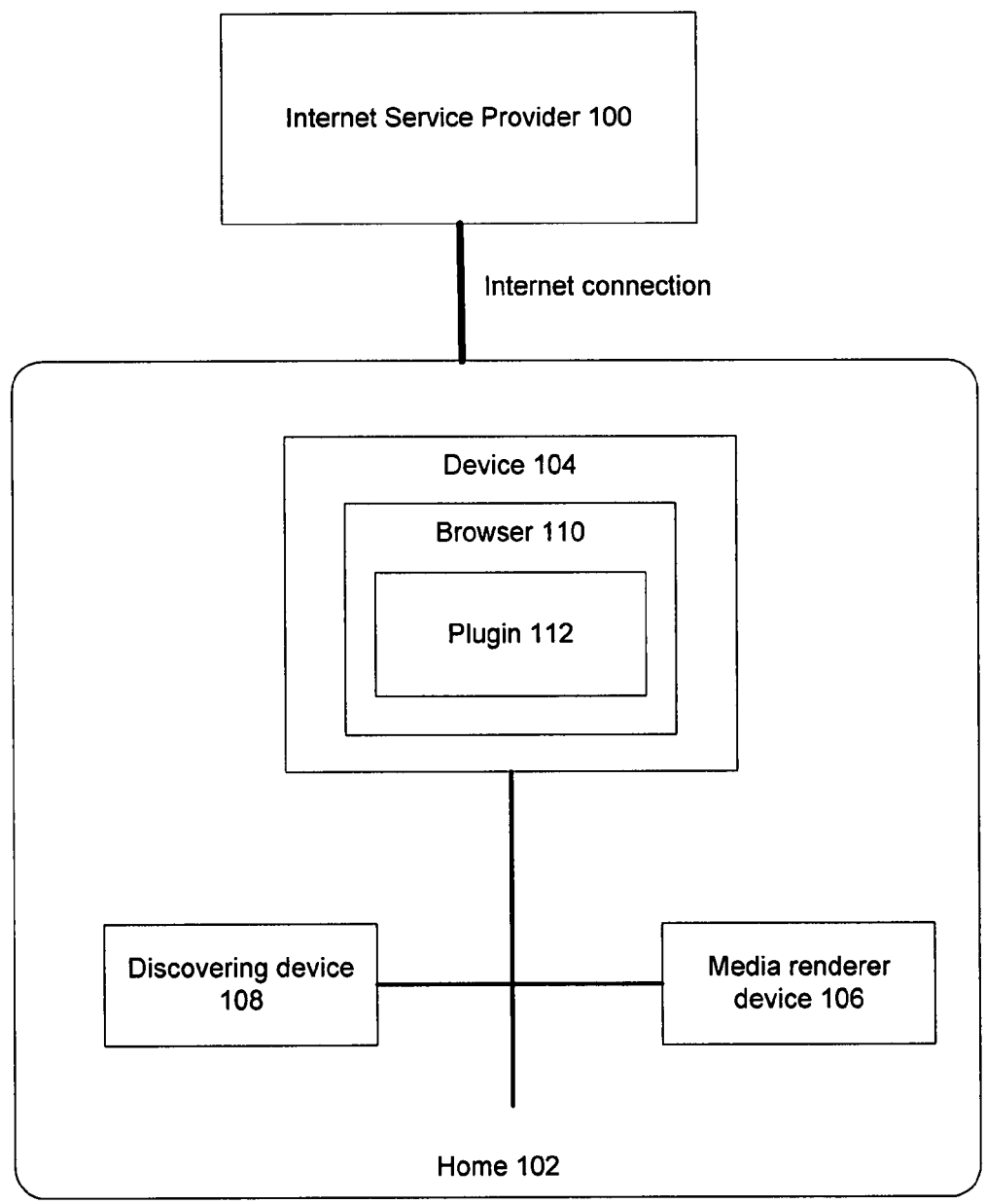
FIG. 2 shows example architecture of integrating contents and services over the Internet and in the home network, according to the present invention.

FIG. 2 shows a more detailed example of integrating contents and services of an Internet service provider (ISP) 100 in the Internet 50, with a home network 102 that is an example of the network 10 (FIG. 1). The Internet service provider (ISP) 100 provides both contents and services, wherein typical contents can be, e.g., video and audio clips, etc., and typical services can be, e.g., streaming services, purchase services, etc. The home network 102 includes a connected device 104 (e.g., PC 21), a media renderer device 106 (e.g., device 30 such as a TV), and a discovering device 108 (e.g., device 20) that is able to discover devices, services and contents in the network.

The devices 104, 106 and 108 are inter-connected via local network technologies, such as Ethernet, IEEE 802.11x, etc. The home network 102 connects to the Internet via e.g., WAN technologies, such as cable, DSL, etc.

The device 104 includes a Web browser 110 which includes a plugin 112 designed for home networking technologies (e.g., a UPnP plugin). A plugin comprises a program that is integrated into another application (e.g., a Web browser), and provides additional functionality that is not available in the application. For a Web browser, a plugin can comprise an add-on that allows the Web browser to properly process and present additional types of content. In one example, a plugin comprises a software program that merges with the Web browser software and allows the Web browser to properly process and present a wider range of content than originally intended. For example, the Flash plugin allows Web browsers to display Flash content.

The plugin 112 enables the services and contents from the ISP 100 to be transcoded into services and contents in the home network 102. The discovering device 108 discovers contents and services in the home network 102. The discovering device 108 further controls services on devices in the home network 102. For example, the discovering device 108 discovers the media renderer device 106 (e.g., TV, display monitor, PC, etc.) and controls the device 106 to render content using a URL of the content on the Internet (e.g., via ISP 100).

Figure 3:
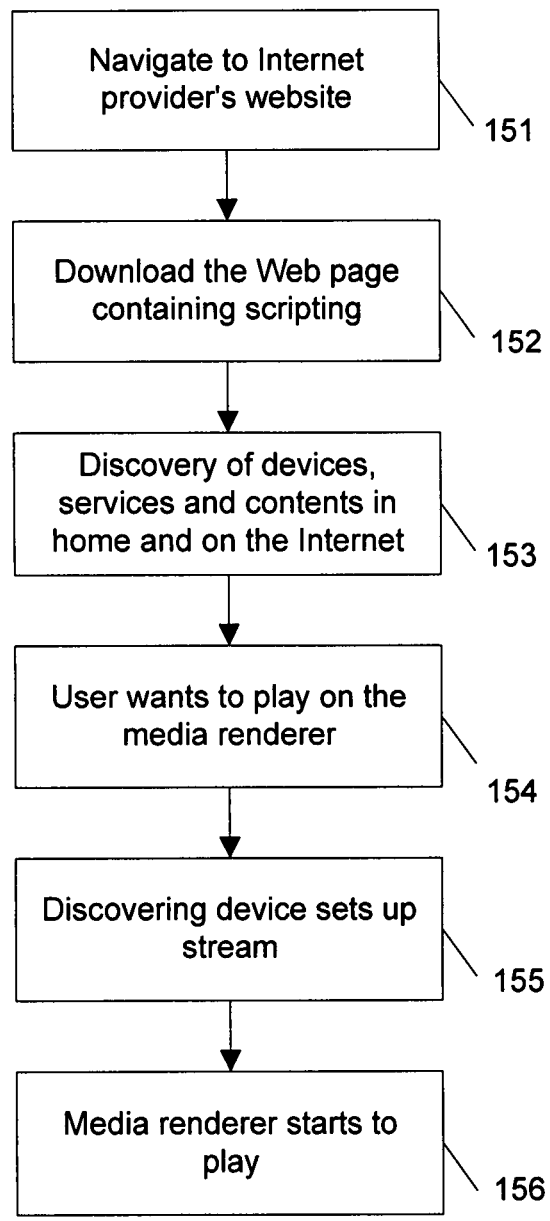
FIG. 3 shows a flowchart of the steps of a process for enabling aggregation of services and contents from the Internet with those services and contents in a home network.

FIG. 3 shows a flowchart of the steps of a process 150 for enabling aggregation of services and contents from the ISP 100 with those services and contents in the home network 102 (FIG. 2), according to an embodiment of the present invention. The process 150 includes the steps of:

Step 151: A user uses the Web browser 110 on a device 104 to browse the Internet 50, and navigates to a website of the ISP 100.

Step 152: The Web browser 110 downloads a web page from the website on the ISP 100 to the device 104. The downloaded web page contains the ISP's scripting functions, such as Javascript functions. The scripting functions are part of the web page from the website, and provide an interface between the ISP 100 and the plugins 112 of the Web browser 110. Further, the scripting functions fetch content from the ISP 100, and call the plugins 112 to transcode that content such that the content can be discovered by a discovering device 108 (in this description, the term "call" refers to a data/function call, command and/or communication). In this example, the scripting function performs one or more of steps (a)-(f) below:

a. instantiate a plugin 112 when the scripting function creates a plugin object;

b. call back to the ISP 100 for available contents and services, by executing Javascript functions when the plugin 112 asks for content/services;

c. call the plugin 112 to convert the contents and services available from the ISP 100 to protocol dependent services and contents for the devices in the home network 102;

d. receive calls from the plugin 112 for control commands (e.g., searching the contents, streaming a video, etc.), from the discovering device 108 in the home network 102 (described in step 155 and 156 further below);

e. periodically call back to the ISP 100 for contents and services states changes, (e.g., using scripting asynchronous call back functions, such as AJAX); and f. download contents, such as photos, audios and videos metadata from the ISP 100.

Step 153: The discovering device 108 discovers a media renderer device 106, and discovers services and contents converted by the plugin 112. The discovery process depends on a particular home networking technology. For example, if the discovering device 108 and the media rendering device 106 are UPnP devices, and the plugin 112 is a UPnP plugin, the discovery process uses UPnP Simple Service Discovery Protocol (SSDP) to discover devices, services and contents.

Step 154: Instead of playing the content discovered from the ISP 100 in step 152, on the browser 110 of device 104, the user wishes to play the content on the media renderer 106.

Step 155: The discovering device 108 calls/commands the media renderer 106 to stream content from the plugin 112 to the media renderer 106 using the content address (e.g., URL) of the ISP.

Step 156: The media renderer 106 starts to stream the content using the content URL and, for example, plays it on the media renderer's screen.

In addition to the plugin 112, the browser 110 can include additional home network technology plugins. Each plugin selectively converts certain services and contents from the ISP 100 to protocol dependent services and contents suitable for one or more devices in the home network 102. For example, a UPnP plugin converts Internet services and contents into UPnP specific services and contents for UPnP-type devices in the home network 102. A Jini plugin converts the Internet services and contents into Jini specific services and contents for Jini-type devices in the home network 102. Multiple plugins allow a user to access Internet services and contents regardless of home networking technologies.

Figure 4:
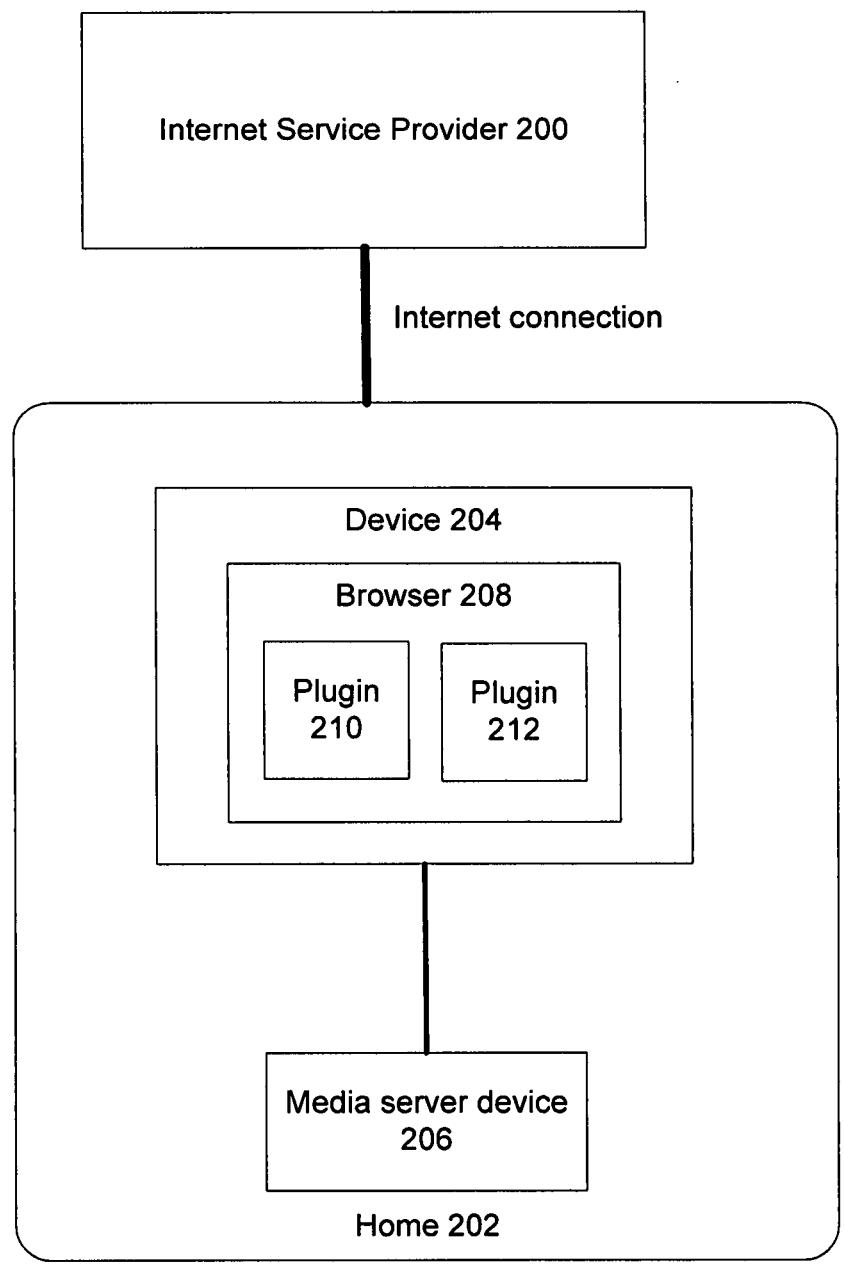
FIG. 4 shows another example architecture of integrating contents and services over the Internet and in a home network, according to another embodiment of the present invention.

FIG. 4 shows another example architecture of integrating contents and services over the Internet and in the home network, according to the present invention. The architecture in FIG. 4 allows contents in a home network (or the Internet) to be presented (e.g., played) on a browser in the home network using Internet services. A home network 202 connects to the Internet via, e.g., WAN technologies, such as cable, DSL, etc. An ISP 200 on the Internet provides services including, e.g., streaming services, purchase services, etc. The home network 202 includes a device 204 (e.g., a desktop PC) implementing a Web browser 208 and a media server device 206. The home network can include other devices. The devices in the home network 202 are connected via local network technologies, such as Ethernet, IEEE 802.11x, etc.

The Web browser 208 which includes a plugin 210 configured to control devices in the home network 202 using a specific home networking technology (e.g., a UPnP control point plugin). The plugin 210 discovers devices, services and contents in the home network 202, and further, controls other devices in the home network 202. The Web browser 208 also includes a media rendering plugin 212, such as a UPnP media render, that can play media content.

Figure 5:
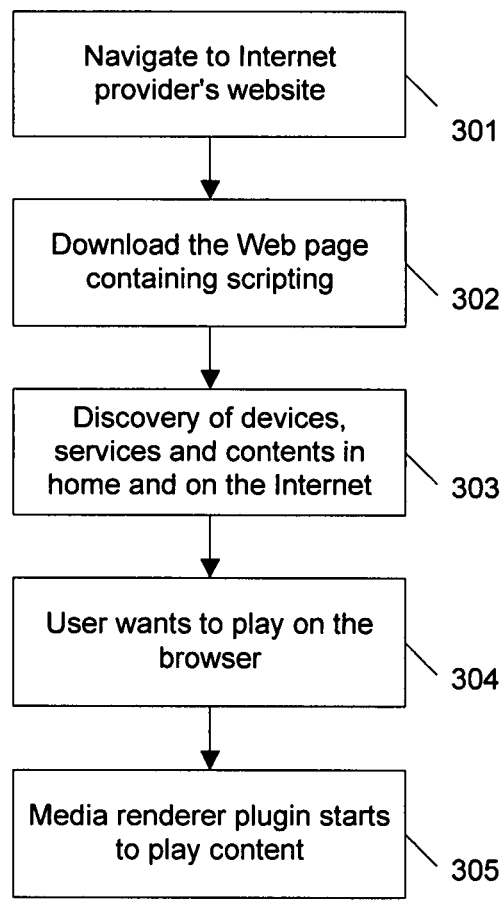
FIG. 5 shows a flowchart of the steps of another process for enabling aggregation of services and contents from the Internet with those services and contents in a home network, according to another embodiment of the present invention.

FIG. 5 shows a flowchart of the steps of a process 300 for enabling integration/aggregation of services and contents from the ISP 200 with those services and contents in the home network 202 (FIG. 4). The process 300 includes the steps of:

Step 301: A user uses the Web browser 208 to browse the Internet and navigates to the website of the ISP 200.

Step 302: The Web browser 208 downloads a web page from the ISP 200. The downloaded web page includes the ISP's scripting functions, such as Javascript functions. The scripting functions are configured to interact with and orchestrate devices, services and content in a home network, for example, to play a movie, to play an audio track, to print a photo, etc. In this example, the scripting function performs one or more of steps (a)-(e) below:

a. creating the plugin object 210 and the plugin object 212 by instantiating the plugins 210 and 212 in the Web browser 208;

b. calling the plugin 210 to discover devices, services and contents in the home network 202 (e.g., as described in step 303 below);

c. calling the plugin 212 to control playing of media content (e.g., as described in step 305 below);

d. receiving function calls from the plugin 210 for devices and services status changes in the home network 202 as part of the discovery process described in step 303 below; and e. receiving function calls from the plugin 212 for media playing status (state) changes as part of the discovery process described in step 303 below.

Step 303: The plugin 210 discovers the device 206 using a home networking technology function. For example, a UPnP plugin can discover: (1) UPnP devices in the home network using UPnP SSDP, (2) contents on the device 206 using content discovery such as "Search" and/or "Browse" in the UPnP Content Directory Service, etc.

Step 304: The user wishes to play content from the device 206 in the Web browser 208 of the device 204.

Step 305: The media renderer plugin 212 starts to stream the content from the device 206 using the location (e.g., the URL) of the content, and plays it on the Web browser 208. The ISP 200 provides scripting functions, similar to applications, to control and play content in the home network.

As discussed above, there can be multiple plugins in the Web browser 208, such that devices, services and contents can be utilized by the Web browser 208, regardless of their underlying networking technologies. As such, in one example, the present invention enables integration/aggregation of services and contents of a local network (e.g., a home network) with services and contents in an external network (e.g., Internet or other content/service source). Therefore, services and contents no matter where they reside (e.g., on the Internet, in another source, in the home network, etc.), are delivered to a user on one or more devices in the home network. This enables applications to be easily developed and distributed over the Internet using popular Web browsers as the platform for application runtime environments.

As is known to those skilled in the art, the aforementioned example architectures described above, according to the present invention, can be implemented in many ways, such as program instructions for execution by a processor, as logic circuits, as an application specific integrated circuit, as firmware, etc.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method comprising:

downloading a web page from a website of a service provider outside of a home network, wherein the service provider provides content and services for user access, and wherein the web page comprises scripting functions that provide an interface between the service provider and a web browser inside the home network; and running the web page using the web browser, wherein the scripting functions of the web page are configured to:

instantiate a first plug-in object;

call the service provider for available content and services;

in response to a request from a discovering device inside the home network for content and services, report the available content and services to the discovering device via a networking protocol;

in response to a request from the discovering device to play a piece of content, stream the piece of content to a media renderer device inside the home network from the service provider through the first plug-in object via a networking protocol; and determine one or more status changes associated with the available content and services;

wherein the scripting functions periodically call the service provider for one or more status changes associated with the available content and services;

wherein the first plug-in object converts the available content and services to protocol dependent content and services, thereby enabling one or more devices inside the home network to discover and access the available content and services; and wherein the available content and services comprise an aggregation of content and services in the Internet and content and services in the home network.

2. The method of claim 1, wherein:
the scripting functions are further configured to convert the available content and services to a format compatible with one or more devices of the home network;
the available content and services are updated based on the one or more status changes determined;
the content and services in the Internet comprise at least one of a video, an audio clip, a streaming, and a purchase service; and
the content and services in the Internet are provided by one or more Internet service providers (ISP).

3. The method of claim 1, wherein Universal Plug and Play Simple Service Discovery Protocol is utilized for reporting the available content and services to the discovering device.

4. The method of claim 1, wherein:
the piece of content is not played on either the web browser or the discovering device; and
the discovering device commands the media renderer device to stream the piece of content from the first plug-in object.

5. The method of claim 1, wherein the scripting functions are further configured to instantiate a second plug-in object, wherein the second plug-in object is different from the first plug-in object, and wherein the second plug-in object is configured to convert the available content and services to a different format than the first plug-in object.

6. The method of claim 1, further comprising:
navigating to the service provider using the web browser; and
streaming content maintained on a device inside the home network to the web browser via the first plug-in object.

7. The method of claim 1, wherein:
the scripting functions include one or more call back functions for communicating with the service provider, wherein the one or more call back functions are used for at least one of the following: call the service provider for available content and services, and periodically call the service provider for one or more status changes associated with the available content and services; and
each status change associated with the available content and services represents one of the following: a content state change for a particular piece of content of the available content and services, and a service state change for a particular service of the available content and services.

8. A system comprising:
a service provider; and
a home network comprising a web browser, a discovering device and a media rendering device interconnected via a networking protocol;
wherein the web browser is configured to:
download a web page from the service provider, wherein the web page comprises scripting functions that provide an interface between the service provider and the web browser; and
run the web page, wherein the scripting functions of the web page are configured to:
instantiate a first plug-in object;
call the service provider for available content and services;
in response to a request from a discovering device for content and services, report the available content and services to the discovering device;
in response to a request from the discovering device to play a piece of content, stream the piece of content from the service provider to the media rendering device through the first plug-in object; and
determine one or more status changes associated with the available content and services;
wherein the discovering device is configured to:
discover, using standard home networking discovery protocols, the available content and services by discovering the web browser;
discover, using standard home networking discovery protocols, the media rendering device; and
cause the media rendering device to stream the piece of content via the first plug-in object;
wherein the scripting functions periodically call the service provider for one or more status changes associated with the available content and services;
wherein the first plug-in object converts the available content and services to protocol dependent content and services, thereby enabling one or more devices inside the home network to discover and access the available content and services; and
wherein the available content and services comprise an aggregation of content and services in the Internet and content and services in the home network.

9. The system of claim 8, wherein:
the home network comprises a Universal Plug and Play network;
the available content and services are updated based on the one or more status changes determined;
the content and services in the Internet comprise at least one of a video, an audio clip, a streaming, and a purchase service;
the content and services in the Internet are provided by one or more Internet service providers (ISP);
the scripting functions include one or more call back functions for communicating with the service provider, wherein the one or more call back functions are used for at least one of the following: call the service provider for available content and services, and determine one or more status changes associated with the available content and services; and
each status change associated with the available content and services represents one of the following: a content state change for a particular piece of content of the available content and services, and a service state change for a particular service of the available content and services.

10. The system of claim 8, wherein the media rendering device comprises a television.

11. A first device in a home network, comprising:
a web browser configured to:
download a web page from a service provider, wherein the web page comprises scripting functions; and
execute the scripting functions to instantiate a first browser plug-in;
wherein the first browser plug-in, when instantiated, is configured to:
receive a discovery request from a second device in the home network for content and services available from the service provider;
return the available content and services to the second device via a networking protocol;

convert the available content and services to protocol dependent content and services, thereby enabling one or more devices inside the home network to discover and access the available content and services; and convert a piece of content from the service provider into a format compatible with a third device in the home network;

wherein the scripting functions are configured to determine one or more status changes associated with the available content and services;

wherein the scripting functions periodically call the service provider for one or more status changes associated with the available content and services;

wherein the web browser is run by a computer processor; and wherein the available content and services comprise an aggregation of content and services in the Internet and content and services in the home network.

12. The first device of claim 11, wherein:

the first device comprises a gateway;

the available content and services are updated based on the one or more status changes determined;

the content and services in the Internet comprise at least one of a video, an audio clip, a streaming, and a purchase service;

the content and services in the Internet are provided by one or more Internet service providers (ISP);

the scripting functions include one or more call back functions for communicating with the service provider, wherein the one or more call back functions are used for at least one of the following: call the service provider for available content and services, and determine one or more status changes associated with the available content and services; and each status change associated with the available content and services represents one of the following: a content state change for a particular piece of content of the available content and services, and a service state change for a particular service of the available content and services.

13. The first device of claim 11, wherein the third device comprises a television.

14. The first device of claim 11, wherein the second device comprises a mobile phone.

15. The first device of claim 11, wherein the web browser is further configured to instantiate a second browser plug-in upon execution of the scripting functions, wherein the second browser plug-in is configured to convert a piece of content from the service provider into different format than the first plug-in object.

16. A non-transitory program storage device readable by a machine tangibly embodying a program of instructions executable by the machine to perform a method comprising:

downloading a web page from a website of a service provider outside of a home network, wherein the service provider provides content and services for user access, and wherein the web page comprises scripting functions that provide an interface between the service provider and a web browser inside the home network;

running the web page using the web browser, wherein the scripting functions of the web page are configured to:

instantiate a first plug-in object;

call the service provider for available content and services;

in response to a request from a discovering device inside the home network for content and services, report the available content and services to the discovering device via a networking protocol;

in response to a request from the discovering device to play a piece of content, stream the piece of content to a media renderer device inside the home network from the service provider through the first plug-in object via a networking protocol; and determine one or more status changes associated with the available content and services;

wherein the scripting functions periodically call the service provider for one or more status changes associated with the available content and services;

wherein the first plug-in object converts the available content and services to protocol dependent content and services, thereby enabling one or more devices inside the home network to discover and access the available content and services; and wherein the available content and services comprise an aggregation of content and services in the Internet and content and services in the home network.

17. The non-transitory program storage device of claim 16, wherein:

the scripting functions are further configured to convert the available content and services to a format compatible with one or more devices of the home network;

the available content and services are updated based on the one or more status changes determined;

the content and services in the Internet comprise at least one of a video, an audio clip, a streaming, and a purchase service; and the content and services in the Internet are provided by one or more Internet service providers (ISP).

18. The non-transitory program storage device of claim 16, wherein Universal Plug and Play Simple Service Discovery Protocol is utilized for reporting the available content and services to the discovering device.

19. The non-transitory program storage device of claim 16, wherein:

the piece of content is not played on either the web browser or the discovering device; and the discovering device commands the media renderer device to stream the piece of content from the first plug-in object.

20. The non-transitory program storage device of claim 16, wherein the scripting functions are further configured to instantiate a second plug-in object, wherein the second plug-in object is different from the first plug-in object, and wherein the second plug-in object is configured to convert the available content and services to a different format than the first plug-in object.

21. The non-transitory program storage device of claim 16, further comprising:

navigating to the service provider using the web browser; and streaming content maintained on a device inside the home network to the web browser via the first plug-in object.

22. The non-transitory program storage device of claim 16, wherein:

the scripting functions include one or more call back functions for communicating with the service provider, wherein the one or more call back functions are used for at least one of the following: call the service provider for available content and services, and periodically call the service provider for one or more status changes associated with the available content and services; and each status change associated with the available content and services represents one of the following: a content state change for a particular piece of content of the available content and services, and a service state change for a particular service of the available content and services.

* * * * *